United States Patent
Daily et al.

(10) Patent No.: US 8,594,315 B1
(45) Date of Patent: Nov. 26, 2013

(54) SPEED DIAL ADMINISTRATION BASED ON CALL HISTORY

(75) Inventors: Daniel J. Daily, Westminster, CO (US); Christopher R. Gentle, NSW (AU); Lisa Y. Kawahara, Colorado Springs, CO (US); Ashis Maity, Arvada, CO (US); Michael J. Thomas, Denver, CO (US); David Volejnicek, Broomfield, CO (US); Douglas W. Swartz, Lakewood, CO (US)

(73) Assignee: Avaya Inc., Basking Ridge, NJ (US)

( * ) Notice: Subject to any disclaimer, the term of this patent is extended or adjusted under 35 U.S.C. 154(b) by 1281 days.

(21) Appl. No.: 11/538,258

(22) Filed: Oct. 3, 2006

(51) Int. Cl.
*H04M 1/00* (2006.01)

(52) U.S. Cl.
USPC ............ 379/355.05; 379/355.02; 379/355.09; 379/202.01

(58) Field of Classification Search
USPC .............................................. 379/355.01–359
See application file for complete search history.

(56) References Cited

U.S. PATENT DOCUMENTS

| | | | | |
|---|---|---|---|---|
| 5,930,350 | A * | 7/1999 | Johnson | 379/355.06 |
| 6,249,579 | B1 * | 6/2001 | Bushnell | 379/356.01 |
| 6,295,355 | B1 * | 9/2001 | O'Neal et al. | 379/355.05 |
| 6,760,431 | B1 * | 7/2004 | Haimi-Cohen | 379/355.01 |
| 6,766,017 | B1 * | 7/2004 | Yang | 379/355.02 |
| 6,990,094 | B1 | 1/2006 | O'Neal et al. | |
| 7,526,081 | B1 * | 4/2009 | Vashisht et al. | 379/433.06 |
| 7,551,899 | B1 * | 6/2009 | Nicolas et al. | 455/73 |
| 2002/0052196 | A1 * | 5/2002 | Padawer et al. | 455/414 |
| 2003/0055899 | A1 * | 3/2003 | Burger et al. | 709/205 |
| 2003/0195930 | A1 | 10/2003 | Henrikson et al. | |
| 2007/0126266 | A1 * | 6/2007 | Kalidindi et al. | 296/223 |
| 2007/0280437 | A1 * | 12/2007 | Patel et al. | 379/88.11 |
| 2008/0049921 | A1 * | 2/2008 | Davis et al. | 379/202.01 |

FOREIGN PATENT DOCUMENTS

| | | |
|---|---|---|
| WO | WO 97/32256 A1 | 9/1997 |
| WO | WO 01/72022 A1 | 9/2001 |
| WO | WO 2005/034483 A2 | 4/2005 |

OTHER PUBLICATIONS

Microsoft TechNet: NetMeeting 2.1 Resource Kit Installation and Configuration; Internet article printed from http://www.microsoft.com/technet/prodtechnol/netmting/reskit/netmtg2/mspx; on Sep. 6, 2006; 22 pgs.

* cited by examiner

*Primary Examiner* — Duc Nguyen
*Assistant Examiner* — Ibraham Sharifzadeh
(74) *Attorney, Agent, or Firm* — Sheridan Ross P.C.

(57) ABSTRACT

The present invention is directed to an auto-configuration agent that guides the user to configure automatically a communication device based on observed user behavior and an auto-completion agent that, as numbers of a telephone address are received from the user, provides a list of matching complete telephone addresses for the user to choose from.

27 Claims, 5 Drawing Sheets

| 300 | 304 | 308 | 312 | 316 | 320 | 324 | 328 | 336 | 332 |
|---|---|---|---|---|---|---|---|---|---|
| Telephone Number | Autodial Number? | Autodial Eligible? | Description | Timestamp | Duration | Answer Type | Call Type | | Autodial Count |
| (303) 568-5600 | Y | Y | Boss | 12/1/2006 8:01 am | 10.5 min | Live | Outgoing | ... | 5 |
| (303) 568-3500 | N | N | Sales Prospect | 12/1/2006 9:06 am | 1 min | Auto | Outgoing | ... | 1 |
| (303) 863-9701 | N | Y | Unknown | 12/1/2006 10:15 am | 10 min | Live | Incoming | ... | 2 |
| (303) 761-5891 | Y | Y | Home | 12/1/2006 1:31 pm | 15 min | Live | Outgoing | ... | 10 |
| ... | | | | | | | | ... | ... |

SPEED DIAL ADMINISTRATION BASED ON CALL HISTORY

FIELD OF THE INVENTION

The invention relates generally to voice communications and particularly to live voice communication devices.

BACKGROUND OF THE INVENTION

Voice communication devices, such as analog and digital telephones and Voice over IP hardphones and softphones, are often relatively complex and time consuming to operate. Due to the numerous features of such devices, users often have too little time to learn how to use the features and/or believe that the cost in time required to learn how to use the features outweighs the perceived benefits of the features. Because the users do not understand the features well, the perceived benefits are often grossly understated.

As a result, most users of voice communication devices use only the most rudimentary of device features and ignore the numerous time saving features offered by the telephone. This refusal to use features represents not only a waste of company resources but also a substantial amount of lost employee time.

SUMMARY OF THE INVENTION

These and other needs are addressed by the various embodiments and configurations of the present invention. The present invention is directed generally, in one embodiment, to an auto-configuration agent that configures automatically a communication device based on observed user behavior and, in another embodiment, to an auto-addressing agent that, as characters in an entered address are received from the user, provides a list of matching complete addresses for the user to choose from.

In a first embodiment of the present invention, a method is provided that includes the steps of:

(a) monitoring a user's manipulation of activators of a voice communication device;

(b) based on step (a), identifying a plurality of activators repetitively activated by the user, wherein user activation of the plurality of activators causes a telecommunication function and/or feature to be performed; and (c) in response to step (b), associating the plurality of activators with a common activator, whereby activation of the common activator automatically causes the telecommunication function and/or feature to be performed.

By way of illustration, this embodiment can predict when the caller wants to set up speed dial and permit the caller to choose whether or not to set up speed dial for a called number. The caller can select the activator to use to speed dial a number. As will be appreciated, "activator" is not limited to physical buttons or keys but can be any other type of identifier, such as a text, icon, or voice command. Speed dial can thus be set up in one step.

In the illustration, the phone, switch, or phone software tracks the numbers a phone user dials. After the user dials the same phone number x times in y days, the user is prompted if he or she would like to program speed dial for the number. If the user responds that he/she would like to program speed dial for the number, he or she is asked to press the button, enter the text, or speak the name to use for the dialed number. As will be appreciated, these steps can be combined so that the act of picking the speed dial activator confirms that speed dial for the number is desired. If the user does not respond to the speed dial prompt within some period of time or declines the prompt, the call is put through.

This embodiment can provide the user with a relatively simple interface to configure his or her communication device. By tracking user behavior, only the features that will actually be used by the user in practice will be configured. By providing an automated user interface, configuration of the features is greatly simplified. The probable result of auto-configuration is a substantial increase in user convenience and time savings in performing autoconfigured communication functions/features.

In another embodiment, a method is provided that includes the steps of:

(a) receiving a signal that a programmable activator has been activated, the activator being associated with multiple telephone addresses;

(b) in response to step (a), initiating automatically outgoing calls to each of the telephone addresses, each telephone address being associated with a participant; and (c) subsequently interconnecting the calls so that each participant's voice stream is provided to each of the other participants.

This embodiment can provide a greatly simplified and convenient way for users to initiate conference calls. Rather than performing the laborious and often complicated steps required to initiate a multi-party conference call, the user can simply associate the participant's addresses with a common activator such that activating the common activator causes the conference call to be set up automatically.

In yet another embodiment, a method is provided that includes the steps of:

(a) receiving a set of digits from a user of a voice communication device, the set of digits representing only a portion of a telephone address;

(b) matching the set of digits against a call history of the user to identify a plurality of telephone addresses comprising the set of digits in the order entered by the user;

(c) providing the plurality of telephone addresses to the user;

(d) receiving a user selection of one of the provided telephone addresses; and (e) in response to step (a) and before the user has manually entered each of the remaining numbers in the telephone address, initiating a call to the selected telephone address.

This embodiment can provide substantial time savings to users when making a call. This functionality is similar to that used in Outlook™ by Microsoft for email addressing, which has an auto-addressing feature for email recipient's addresses. By limiting the selectable addresses by recency of use and not attempting to match entered characters until standard, widely used parts of the address have already been entered, fewer matches will be identified and the often limited display capability of voice communication devices can be accommodated.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Overview of Architecture

Figure 1:
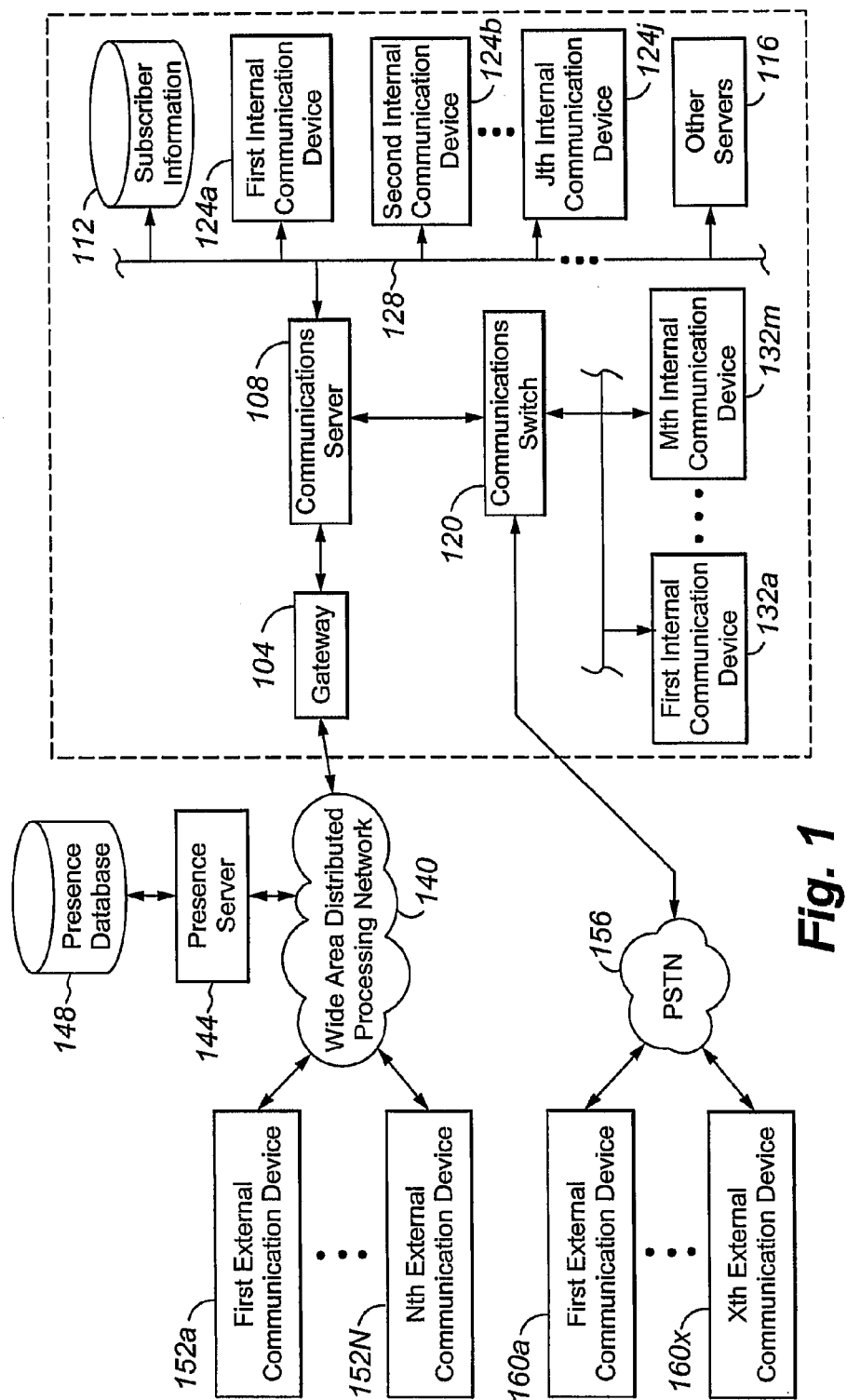
FIG. 1 is a block diagram of an architecture according to an embodiment of the present invention.

FIG. 1 shows an illustrative embodiment of the present invention.

An enterprise contact center 100 denoted by dashed lines comprises a gateway 104, central communications server 108, a set of data stores or databases 112 containing subscriber-related information, a plurality of application servers 116, and first, second, . . . jth internal packet-switched communication devices 124a-j, all interconnected by a trusted local area network LAN (or wide area network WAN) 128, and a switch 120 controlling first, . . . mth internal circuit-switched communication devices 132a-m.

The gateway 104 can be any suitable device for controlling ingress to and egress from the corresponding LAN. The gateway is positioned logically between the other components in the corresponding enterprise premises and the network 140 to process communications passing between the server and the network 140. The gateway 104 typically includes an electronic repeater functionality that intercepts and steers electrical signals from the network 140 to the corresponding LAN 128 and vice versa and provides code and protocol conversion. Examples of suitable gateways include Avaya Inc.'s, G700™, G650™, G350™, MCC/SCC™ media gateways and Acme Packet's Net-Net 4000 Session Border Controller.

The communications server 108 and switch 120 direct communications, such as incoming Voice Over IP or VoIP and telephone calls, in the enterprise network. The terms "switch", "server", and "switch and/or server" as used herein should be understood to include an ACD, a Private Branch Exchange PBX (or Private Automatic Exchange PAX) an enterprise switch, an enterprise server, or other type of telecommunications system switch or server, as well as other types of processor-based communication control devices such as media servers, computers, adjuncts, etc. The switch/(media) server can be any architecture for directing contacts to one or more communication devices. Illustratively, the switch and server of FIG. 1 can be a modified form of Avaya Inc.'s Definity™ Private-Branch Exchange (PBX)-based ACD system or MultiVantage™ PBX running modified Advocate™ software, CRM Central 2000 Server™, Communication Manager™, S8300™ media server, SIP Enabled Services™, and/or Avaya Interaction Center™. The switch and server are typically stored-program-controlled systems that conventionally include interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality.

The first, second, . . . jth communication devices 124a-j are preferably packet-switched wired or wireless stations or communication devices, such as IP hardphones (e.g., Avaya Inc.'s 4600 Series IP Phones™), IP softphones (e.g., Avaya Inc.'s IP Softphone™), Personal Digital Assistants or PDAs, Personal Computers or PCs, laptops, packet-based H.320 video phones and conferencing units, packet-based voice messaging and response units, peer-to-peer based communication devices, and packet-based traditional computer telephony adjuncts. Examples of suitable devices are the 4610™, 4621SW™, and 9620™ IP telephones of Avaya, Inc.

The first, . . . mth communication devices 132a-m are preferably circuit-switched and/or TDM wired or wireless devices. As will be appreciated, the devices are normally plugged into a Tip Ring interface that causes electronic signals from the station to be placed onto a TDM bus (not shown). Each of the stations corresponds to one of a set of internal (Direct-Inward-Dial) extensions on its controlling switch/server. The switch 120 can direct incoming contacts to and receive outgoing contacts from these extensions in a conventional manner. The devices 132a-m can include, for example, wired and wireless telephones, PDAs, H.320 video phones and conferencing units, voice messaging and response units, and traditional computer telephony adjuncts. Examples of suitable devices are the 30010™, 2410™, and 2420™ Digital Telephones of Avaya Inc.

The other servers 116 can include a variety of application servers, such as a fax server, web server, a data network server, an email server, instant messaging server, scanner, interactive voice recognition IVR software, VoIP software, video call software, voice messaging software, an IP voice server and proxy servers.

The enterprise contact center 100 is connected, via wide area distributed processing network 140, to a subscriber presence server 144 and associated presence database 148 and first, . . . nth external packet-switched wired or wireless communication devices 152a-n, and, via Public Switched Telephone Network (PSTN) 156, to first, . . . xth external circuit-switched wired or wireless communication devices 160a-x. The WAN 140 is preferably an untrusted network, such as the Internet. The first, . . . nth and first, . . . xth external communication devices 152a-n can be any of the communication devices described above. An "external" communication device is not controlled by an enterprise switch/server (e.g., does not have an extension serviced by the switch/server) while an "internal" device is controlled by an enterprise switch/server.

The presence server 144 and associated presence information database 148 may or may not be operated by the enterprise. The presence server 144 and presence information database 148 collectively track the presence and/or availability of called parties and/or their communication devices and provide, to requesting user agents in communication devices, current presence information respecting selected called parties. As used herein, "presence information" refers to any information associated with a network node and/or endpoint device, such as a communication device, that is in turn associated with a person or identity. Presence information generally indicates what kind of context the called party is in and what kind of communication, if any, is appropriate to reach successfully the called party. Examples of presence information include information regarding the accessibility of the endpoint device, the recency of use of the endpoint device by the person, recency of authentication by the person to a network component, and the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, restrictions on contactor identities or persons from whom the called party does not wish to be contacted at specific devices, and permissible contact type and/or subjects such as subjects about which the person does wish to be contacted).

The present invention may be used with either a client-server architecture or a peer-to-peer architecture, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparently to the user. By contrast in the peer-to-peer model or paradigm, each networked host runs both the client and server parts of an application program. Moreover, the invention does not require a specific Internet Protocol Telephony (IPT) protocol and could be implemented, for example, using QSIG, H.323, and combinations thereof. Additionally, the invention does not require the presence of packet- or circuit-switched networks.

Figure 2:
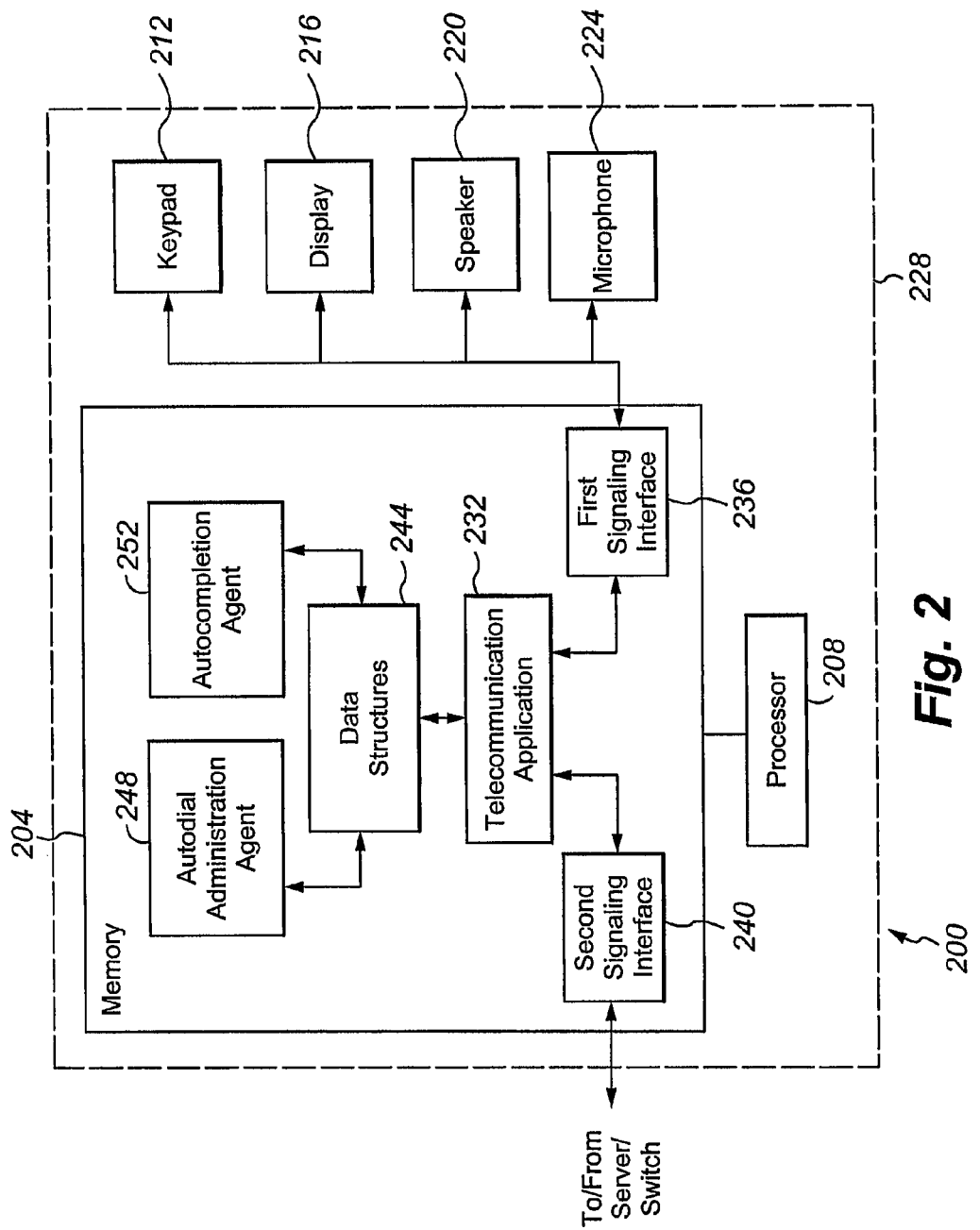
FIG. 2 is a block diagram of a voice communication device according to an embodiment of the present invention.

Referring to FIG. 2, a voice communication device 200 according to an embodiment of the present invention is depicted. The device 200 can be used for any of the internal or external communication devices 124a-j, 132a-m, 152a-n, and 160a-x. The device 200 includes a memory 204, processor 208, keypad 212, graphical user display 216, speaker 220, and microphone 224, all enclosed by a housing 228.

In the memory 204, the device 200 includes a telecommunication application 232 for providing and controlling various telecommunication functions and features of the device 200, a first signaling interface 236 for handling control and bearer signaling between the application 232 and the keypad 212, display 216, speaker 220, and microphone 224, a second signaling interface 240 for handling control and bearer signaling between the application 232 and the server 108 and/or switch 120, a set of data structures 244 administered by the telecommunications application 232, an autodial administration agent 248 for configuring, automatically or in response to automatically prompted user input, programmable and non-programmable keys, and an auto-completion agent 252 for prompting the user with potential matches to a set of user entered digits when the user is dialing a number or telephone address. Although not shown, the memory 204 contains other functional modules, such as an operating system and drivers for the keypad 212, display 216, speaker 220, and microphone 224.

The Autodial Administration Agent

The autodial administration agent 248 monitors the behavior of the user and, for repetitive actions, either creates automatically and/or automatically prompts the user for permission to create a macro-type function associated with a selected key, the depression of which would cause the repetitive actions to be performed automatically. In other words, the communication device would emulate or simulate the key presses in response to the user depressing the macro key once. Because the repetitive actions typically require the sequential activation of a number of keys or buttons on the keypad 212, associating the repetitively and sequentially activated keys with a single, typically programmable, key can provide substantial time savings to the user and increase significantly the convenience of the user in using the communication device.

Any telephony feature and/or function associated can be associated with the macro-type key. For example, the agent 248 can monitor telephone addresses of incoming and/or outgoing voice calls and create automatically and/or prompt the user for permission to associate frequently used telephone addresses with a programmable autodial key. Other features/functions which may be administered automatically in response to monitoring user behavior include conference calls, calling a party that requires a number and a code, dialing a call center and navigating a common menu (e.g., for Information Technology or IT support if the user calls a number and always presses some fixed buttons after 1 and 3 seconds), administering out-of-office messages. The button identifiers can be stored and replayed when the corresponding autodial key is activated, long-distance access number and account code, and administering out-of-office messages.

Techniques known to one of ordinary skill in the art may be used to recognize repetitive sequences of key activations over a selected time period, which trigger the agent 248 to create a macro key. The tracking requires the application 232 to maintain a set of data structures tracking user behavior over the selected time period. The data structures include identifiers for each key on the communication device and list the identifiers in the order in which the corresponding keys are pressed. A timestamp is associated with each set of listed identifiers. A maximum time duration between key presses may be required for the sequential key presses to be considered part of the same user activated event. Alternatively or additionally, the agent may track instances of telecommunication features/functions and, for each feature/function, have a predefined mapping structure, which indicates whether or not to prompt the user for permission to create or to create automatically a macro key. Some features/functions already have a single dedicated key on the keypad and therefore will not be desirable to be associated with yet another key.

Although the autodial administration agent 248 will hereinafter be discussed with reference to the autodial or abbreviated dialing function only, it is to be understood that it may be used for configuring automatically a number of other telecommunication functions and features, including those listed above.

The functionality of the agent 248 will be described with reference to an exemplary set of data structures 244 shown in FIG. 3. The data structures 244 include the incoming or outgoing telephone number 300, an autodial indicator 304 indicating whether or not the associated number is already associated with an autodial key, an autodial eligibility indicator 308 indicating whether or not the associated number is eligible for autodial consideration, a descriptor 312 describing one or more characteristics of the associated telephone number or a person associated therewith, a timestamp 316 associated with the number, a duration 320 of the communication session with the associated number, an answer type 324, a call type 328, and an autodial counter 332. Other fields may be included, such as an importance indicator indicating the importance to the user of the person associated with the respective number.

The continued portion 336 of the data structure is populated by additional call instances, each instance including the variables 316, 320, 324, and 328. The data structures are concatenated as shown.

The telephone number 300 can be local or long distance and internal or external to the enterprise network 100.

The autodial number indicator 304 is a binary variable indicating whether or not the associated number is currently associated with an autodial key. When the number is disassociated with any autodial key, the indicator 304 is restored to a value indicating that the number is no longer associated with an autodial key.

The eligibility indicator 308 is also a binary variable indicating whether or not the associated number is eligible to be associated with an autodial key. The number is ineligible, for example, when the user has previously removed the number from a prior associated with an autodial key, the user has indicated in response to a prompt by the agent 248 that the number is not to be associated with an autodial key, and user preferences in the presence database 148 indicate that the number is ineligible for autodial key status. With respect to user preferences, for example, when the user has placed limitations on the associated number, such as when and/or where calls from the number may be directed, the agent 248 may deem the number to be ineligible for autodial status.

The descriptor 312 may be entered by the user in response to a prompt by the agent 248, contained in a contact list in the user's records in subscriber database 112, and/or contained in the user's records in the presence database 148. The descriptor typically describes a characteristic of the device associated with the number 300 and/or the person associated with the number 300. In the examples shown, the descriptor 312 is associated with person, e.g., "boss", "sales prospect", "unknown", and "home".

The timestamp 316 is a timestamp associated with a selected event corresponding to the associated number 300. For example, for an outgoing call the timestamp may be the time when the last digit of the outgoing call was received, the time when the call setup signal was sent to the called communication device, the time when the call was answered at the called communication device, and the like, and, for an incoming call, the timestamp can be the time when the call set up was received from the calling communication device by the enterprise network 100, the time when the call was answered by the called internal communication device, and the like.

The duration 320 references the duration of the session. For example, "duration" may be measured from the time that the call setup command was sent/received until the call disconnect signal is sent/received. It may be measured from the time that the call was answered until the call disconnect signal is sent/received.

The answer type 324 indicates the disposition of the call at the called communication device. "Live" means that a live person answered the call, "auto" means that an answering machine answered the call, "none" means that the call was not answered, "busy" means that the user is currently on another call and does not have call coverage, and the like. The application can use known techniques to determine whether the call was answered by the answer machine. For example, the application can measure and analyze amplitude, frequency, and spectral parameters of the signals received from the far end communication device.

The call type 328 is a binary variable indicating whether the call is incoming to the associated communication device or outgoing from the associated communication device.

The autodial counter 332 indicates the number of incoming and/or outgoing calls over a specified time period that qualify as a basis for the associated number 300 to be considered for autodial status. The time period may be any length of time specified by the user or otherwise selected by administration and typically is a few weeks to one month in duration. The criteria for a call to qualify as an instance contributing to the value of the autodial counter can be user configured or administered. Typical criteria include the duration of the call having a threshold value (to exclude voice messages, no answer calls, and the like), answer type being live, and the call type being one or outgoing or incoming, and the like. In the example of FIG. 3, number (303)568-5600 has an autodial counter value of 5, (303)568-3500 a value of 1, (303)863-9701 a value of 2, and (303)761-5891 a value of 10.

In one configuration, the autodial agent 248 associates multiple telephone numbers with a single programmable key so that activation of the key causes automatic placement of a conference call. Stated another way, a selected programmable key would be associated with an autodial group rather than just a single number. As will be appreciated, periodic conference calls involving the same participants are used in many business applications. Each time a recurring conference call is made, the user laboriously inputs the same numbers and hits the same feature keys (e.g., conference or transfer). In this configuration, the user is able to associate simultaneously multiple numbers with the same programmable key such that when the programmable key is activated, the communication device initiates the conference call automatically and without needing further key presses by the user. The conference call is initiated by placing a call to each of the numbers and then joining or interconnecting the calls together so that each participant receives the voice stream output by each of the other participants. The interconnecting may be done, for example, by bridging one call onto another call.

The conference call may be placed in several ways.

For example, the communication device can emulate the key presses normally performed by the user. By way of illustration, the agent 248 would generate and forward to the switch/server the signals for the first number of the first conference participant, when the first participant answers generate and forward the signal associated with the transfer or conference key (which places the first participant on hold), generate and forward to the switch/server the signals for the second number of the second participant, and when the second participant answers generate and forward the signal associated with the transfer or conference key (which causes all participants to be one the line simultaneously). While these steps are performed, the user maintains the device in the off hook state, such as by holding the handset to his or her ear or pressing the speaker button (which may be associated with the programmable key in which case it would be emulated by the device before the first number is generated).

In another example, the communication device, when the key is pressed, can send the various numbers for the conference call to the switch/server or a conference adjunct with a request for the switch/server or adjunct to initiate a conference call to the various numbers. The switch/server or adjunct would then initiate successive calls to each of the numbers with appropriate recorded messages and on hold music as noted above. This example is advantageous in that the number of conference participants is not limited as in the prior example.

The order of placement of the calls to the various numbers can be selected by the user, administered, and/or determined by the historic behavior by the user.

The association of multiple numbers with a common autodial key can be generated automatically or in response to an automatically generated user prompt or in response to a user initiated configuration session. When automated, the data structures 244 could include multiple numbers associated with an entry. The multiple numbers could appear in the same line of the number listing or pointers could be used to associate the numbers (which are likely listed elsewhere for non-conference calls involving the user) to the line. For automated conference call key association, a longer selected time period would be likely be used than for automated nonconference call key association.

A pre-recorded message by the user may be played to each conference participant when he or she answers. For example, the user's pre-recorded message might be "This is your scheduled conference call. Please wait while the other participants are joined." The message could be followed by on hold music while the second call is made to the second number.

Figure 5:
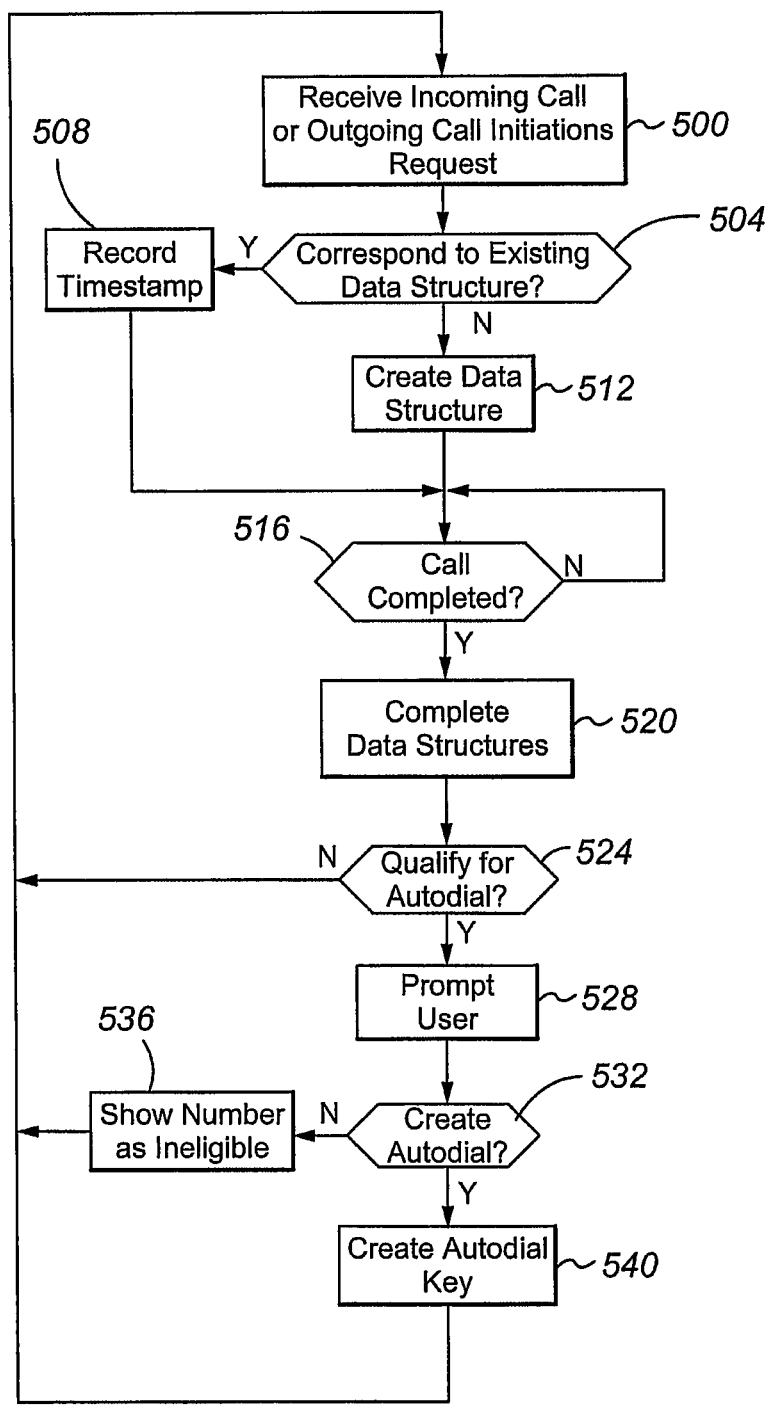
FIG. 5 is a flow chart according to an embodiment of the present invention.

An operational embodiment of the autodial agent 248 will now be described with reference to FIG. 5.

In step 500, the selected communication device receives an incoming call or makes an outgoing call initiation request 500.

In decision diamond 504, the application 232 determines whether the call corresponds to an existing data structure. If so, the application 232 records the timestamp in step 508, and, if not, the application 232 creates a data structure (e.g., new line of the set of data structures of FIG. 3) including the timestamp in step 512.

In decision diamond 516, the application 232 determines whether the call is completed. This is determined by determining when the phone enters the on-hook state or when a disconnect signal is received from the other communication device. The application 232 repeats decision diamond 516 at periodic intervals until the call is completed.

When the call is completed, the application, in step 520, completes the data structures, such as by entering the call duration 320 and answer type 324 and incrementing the autodial counter 332, if the completed call qualifies as an instance. The application 232 then invokes the autodial agent 248.

The autodial agent 248, in decision diamond 524 determines whether the number associated with the completed call qualifies for association with an autodial key. This determination is made by comparing the counter 332 value with a selected threshold.

When the value equals or exceeds the threshold 332 and when the associated number is not currently in use as an autodial number and is eligible for autodial treatment, the number qualifies for autodial status. When the value does not equal or exceed the threshold 332, when the associated number is currently in use as an autodial number, or when the number is ineligible for autodial treatment, the number does not qualify for autodial status.

When the number does not qualify for autodial status, the agent 248 terminates, and the process returns to step 500.

When the number qualifies for autodial status, the agent 248 optionally audibly or visually prompts the user in step 528 for permission to associate the number with an autodial key. When there are no available autodial keys, the prompt may further ask the user to specify which autodial key the number is to be associated. In other words, the user will be prompted to select which autodial key is have its current association changed from a first number to a second number. By way of illustration, an audible message played to the user could be of the form "If you would like to set up speed dial for this number, press the key that you would like to use for the speed dial." This prompt could be before or after the call placement. Alternatively, the agent could select the least or last used autodial key and notify the user of the key selected. This would require the agent to monitor usage of the telephone number after it has been associated with an autodial key. In one configuration, the agent provides a prompt to the user to add the currently dialed telephone number(s) to the telephone or address book as well as prompting the user to associate the number with an autodial key. If done after call termination, the user's phone will ring with an automated message requesting whether or not the user wishes to create an autodial button for the other number in the call.

When the user does not elect to create a new autodial key for the number, the agent 248, in step 536, changes the value of the autodial eligibility indicator 308 to be ineligible.

When the user elects to create a new autodial key for the number, the agent 248, in step 540, updates the data structures to associate the number with the key, removes a prior association of the key with another number (if such an association exists), changes the value of the autodial number indicator 304 to indicate that the number already is associated with an autodial key, and informs the user of the key identifier for the autodial key newly associated with the number.

After performing either step 536 or 540, the agent 248 terminates operation and returns to step 500.

The Auto-Completion Agent

The memory 204 further includes an auto-completion agent 252 that monitors digits entered by the user, matches the entered digits to recently used numbers, and provides the user with a drop down list of possible matches and a cursor to be used to select the desired match. The required recency of use for a number to be eligible for inclusion in the list can be user configured or administered.

Figures 3, 4:
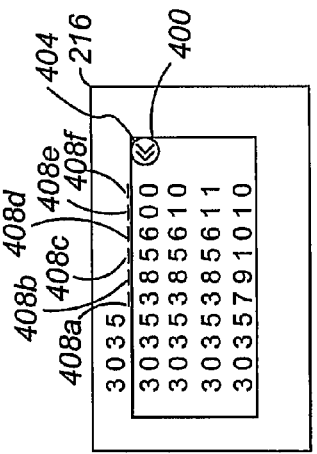
FIG. 3 is an exemplary set of data structures according to an embodiment of the present invention.
FIG. 4 is a screen shot of a voice communication drop down list according to an embodiment of the present invention.

An example drop down list is shown in FIG. 4. The user has entered four of the digits in a 10-digit string for a local call. The entered digits, namely "3035" are matched against recently used telephone numbers 300 (used in incoming or outgoing calls) and provides a drop down list 400 containing the potential matches and a cursor 404 to be positioned by the user adjacent to the selected number. The cursor 404 may be positioned, for example, using arrow keys on the keypad and, when positioned adjacent to the selected number, the selection indicated by activation the enter or OK key. In the example drop down list 400, there are four numbers listed, each having the same first four digits as the partially entered number. In the matching function, wildcards are inserted in the blank spaces 408a-f and the resulting string matched against recently used numbers in the data structures 244. Although a 10-digit local number is shown in FIG. 4, it is to be understood that the drop down list 400 can be used for any string lengths, including for example 4- or 5-digits (for extensions within the enterprise network 100), 7-digits, 11-digits (long distance), and longer than 11-digits (for international calls).

Figure 6:
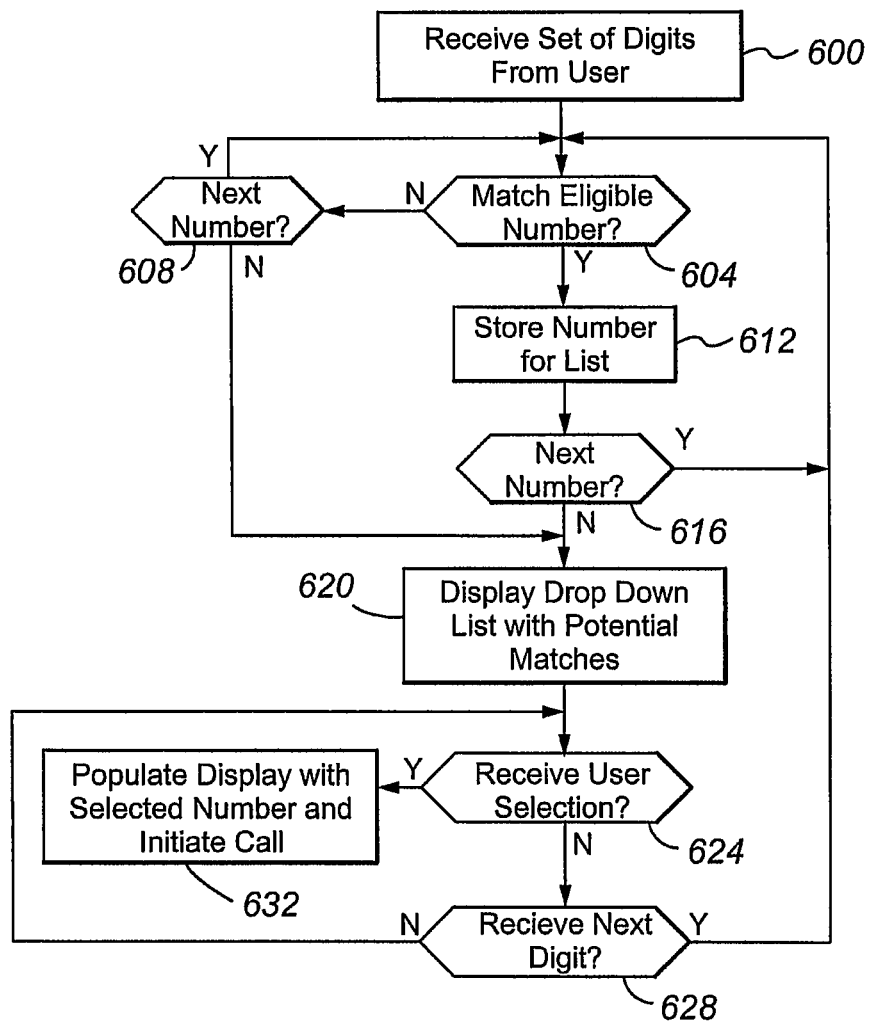
FIG. 6 is a flow chart according to an embodiment of the present invention.

An operational embodiment of the agent 252 will now be discussed with reference to FIG. 6.

In step 600, the agent 252 receives a set of digits entered by the user. The set of digits may include one or more digits. In a preferred configuration to control the length of the drop down list, which may be limited due to the limited size of the display 216 in a telephone, the agent 252 will require a minimum number of digits before a drop down list will be provided. The minimum number may be an absolute number or a number in excess of a standard code. As will be appreciated, in the AT&T 3-3-4 telephone structure, a telephone number has a national prefix and one or more nationally defined subfields. As used herein, a "standard code" refers to an area code (e.g., "303"), a city code, a switch identifier at a central office or telephone exchange (e.g., " "568", "863", and "761"), a country code (e.g., "1"), and/or an international access code (e.g., "011"). As will further appreciated, fixed or variable telephone number structures other than the AT&T 3-3-4 structure may be used, such as ITU Recommendation E.164. In this approach, the agent 252 would ignore the standard code digits and wait to receive one or more digits of the line number before attempting to generate a list of potential matches. In the example of FIG. 4 for example, the agent 252 would, for the first number, ignore the standard codes "303" and "538" and wait until the first digit of the line number "5600" is entered by the user before generating a list of matching numbers. The standard codes would, however, be considered in generating the listing of matching numbers.

When the appropriate number of digits has been received, the agent 252, in decision diamond 604, attempts to match, by any suitable matching algorithm, the entered digits against the data structures. When the selected number is not a match, the agent 252, in decision diamond 608, determines if there is a next recently used number in the called subscriber's respective incoming and/or outgoing call data structures. If so, the number is selected and it is determined to decision diamond 604 whether it matches the entered digits. In one configuration, only numbers associated with recent calls of a minimum duration are selected. This prevents misdialed numbers from being included in the list.

When in decision diamond 604, the selected number matches the entered digits, the number is stored in a listing of matching numbers in step 612, and the agent 252, in decision diamond 616, determines whether there is a next recently used number in the respective data structures to be considered as a potential match. If so, the agent 252 selects the number and the agent proceeds to decision diamond 604 and determines whether it matches the entered digits.

After all recently used numbers have been considered, the agent 252, in step 620, displays on the display 216 the drop down list of matching numbers.

In decision diamond 624, the agent 252 determines after a predetermined time whether the user has selected one of the listed numbers. If so, the agent 252, in step 632, populates the display with the selected number and initiates a call to that number. If no selection has been received, the agent 252, in decision diamond 628, determines whether the communication device has received a next digit from the user.

When a next digit has been received, the agent 252 returns to decision diamond 604 and repeats the matching steps with the newly updated set of digits.

When a next digit has not been received, the agent returns to decision diamond 624.

Even if the user fails to select a number from the drop down list, the agent 252 will ultimately receive a match. Specifically when the user has entered all of the digits of the number, the agent 252 will have a perfect match and will proceed to step 632.

A number of variations and modifications of the invention can be used. It would be possible to provide for some features of the invention without providing others.

For example in one alternative embodiment, the autodial agent would create a bookmark entry for a frequently used website address (e.g., Universal Resource Locator or URL). When a URL has been used frequently by the user, the agent would prompt the user whether he or she desired to create a bookmark for the URL. If so, the bookmark would be created without further commands from the user.

In another alternative embodiment, the autodial agent is used to create autodial keys for use on a facsimile machine.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or foul's disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:

monitoring, by a processor executable autodial administration agent, a user's manipulation of a plurality of activators of a voice communication device by maintaining a set of data structures comprising a set of activator identifiers associated with the plurality of activators of the voice communication device, a timestamp associated with an instance of user activation of a sequence of two or more of activators or receipt of a call from a telephone number corresponding to the plurality of activators, and a counter indicating a number of instances, within a selected time period, that a user has activated the sequence of two or more of activators or received a call from the telephone number, wherein the set of data structures further comprises an answer type of a call to a telephone number associated with the sequence of two or more of activators and wherein the answer type describes one of: a live person answered the call, an answering machine answered the call, the call was not answered, and a called telephone number was busy when the call was placed;

based on the monitoring of the user's manipulation of the plurality of activators, identifying, by the processor executable autodial administration agent, a selected sequence of two or more activators repetitively activated by the user, wherein user activation of the selected sequence of the two or more activators causes at least one of a selected telecommunication function and a selected telecommunication feature to be performed, wherein at least one activator of the selected sequence corresponds to the at least one of a selected telecommunication function and a selected telecommunication feature, and wherein the at least one of a selected telecommunication function and a selected telecommunication feature is not associated with calling a single phone number;

in response to identifying the selected sequence of two or more activators repetitively activated by the user, automatically prompting, by the processor executable autodial administration agent, the user whether to associate the selected sequence of two or more of activators with a common activator, whereby activation of the common activator automatically causes the at least one of a selected telecommunication function and a selected telecommunication feature to be performed;

when the user affirmatively responds, automatically associating, by the processor executable autodial administration agent, the selected sequence of two or more of activators with the common activator; and when the user negatively responds, not associating, by the processor executable autodial administration agent, the selected sequence of two or more of activators with the common activator and marking the selected sequence of two or more of activators as being ineligible for further prompting of the user in automatically prompting the user whether to associate the selected sequence of two or more of activators with a common activator in connection with the at least one of a selected telecommunication function and a selected telecommunication feature.

2. The method of claim 1, wherein the at least one of the selected telecommunication function and the selected telecommunication feature is placement of a call to a selected telephone address, wherein, by the common activator is a programmable key, wherein, user activation of the common activator causes a telephone number to be dialed, and wherein not associating the sequence of two or more of activators with the common activator further instances of activation of the sequence of two or more of activators are thereafter ignored.

3. The method of claim 1, wherein at least one of the selected telecommunication function and the selected telecommunication feature is one of navigating a common menu, playing an account code, and administering out-of-office messages and wherein, when the user presses the common activator once, further comprising:

the voice communication device simulating the activation of the selected sequence of two or more of activators required to perform the at least one of the selected telecommunication function and the selected telecommunication feature.

4. The method of claim 1, wherein at least one of the selected telecommunication function and the selected telecommunication feature is initiation of a telephone call, wherein the common activator is a programmable key, wherein identifying the selected sequence of two or more activators repetitively activated by the user, automatically associates the sequence of two or more of activators with the common activator, and not associating the plurality of activators sequence of two or more of activators with the common activator occurs after the user has activated the programmable key and prior to placement of the telephone call, and wherein the set of data structures further includes a duration of the telephone call associated with the plurality of activators.

5. The method of claim 1, wherein at least one of the selected telecommunication function and the selected telecommunication feature is a telephone call and wherein identifying the selected sequence of two or more activators repetitively activated by the user comprises the sub-steps:

comparing a number of instances of calls to or from a telephone address corresponding to the selected sequence of two or more of activators with a selected threshold frequency;

when the number of instances exceed the selected threshold frequency, performing automatically prompting the user whether to associate the selected sequence of two or more of activators with a common activator; and when the number of instances do not exceed the selected threshold frequency, not performing automatically associating, by the processor executable autodial administration agent, the selected sequence of two or more of activators with the common activator.

6. The method of claim 1, wherein at least one of the selected telecommunication function and the selected telecommunication feature is a conference call involving at least three participants including the user and wherein activation of the selected sequence of two or more of activators causes sequential initiation of calls from the user to the other participants and interconnecting the calls to provide conferencing.

7. A non-transitory computer readable medium comprising processor executable instructions for performing the steps of claim 1.

8. The method of claim 1, wherein the set of data structures further comprise a duration of a call to or from a telephone address associated with the plurality of activators.

9. The method of claim 1, wherein a sequence of two or more of activators corresponds to a telephone number and wherein the set of data structures further comprises an autodial eligibility indicator to indicate whether or not a telephone number associated with the telephone number is eligible to be associated with the common activator.

10. The method of claim 9, wherein the telephone number is ineligible when the user has previously removed the telephone number from a prior associated with the common activator or the user has indicated in response to a prompt that the telephone number is not to be associated with the common activator.

11. The method of claim 1, wherein a sequence of two or more of activators corresponds to a telephone number and wherein the set of data structures further comprises a descriptor associated with the plurality of activator identifiers, the descriptor describing a characteristic of at least one of a communication device and person associated with the telephone number.

12. The method of claim 1, wherein the set of data structures further comprises a call type, the call type indicating whether a telephone call to or from a telephone number associated with a sequence of two or more of activators is incoming to the voice communication device or outgoing from the voice communication device.

13. The method of claim 6, wherein initiation of the calls from the user to the other participants and interconnecting the calls to provide conferencing comprises:
sending telephone numbers for the conference call to a switch with a request to initiate a conference call to the telephone numbers; and
initiating, by the switch, successive telephone calls to each of the telephone numbers with an appropriate recorded message and hold music.

14. A conferencing method, comprising:
monitoring, by a processor executable autodial administration agent, a user's manipulation of a plurality of activators of a voice communication device;
based on the monitoring step, determining, by the processor executable autodial administration agent, that the user has repetitively made a conference call to at least a first and second participants, wherein to make the conference call the user activates a sequence of the plurality of activators;
in response to the determining step, associating, by the processor executable autodial administration agent, the sequence of two or more of activators with a programmable activator;
thereinafter receiving, by the processor executable autodial administration agent in the voice communication device, a signal that the programmable activator has been activated by the user, the activator being associated with multiple telephone addresses for the first and second participants;
in response to initiating automatically, by at least one of a switch and a server, a first call to a first telephone address, the first telephone address being associated with the first participant;
in response to forwarding, by the processor executable autodial administration agent to the at least one of the switch and the server, a signal associated with activation of a transfer or conference key;
when the first participant answers the first call, initiating automatically, by the at least one of the switch and the server, a second call to a second telephone address, the second telephone address being associated with a second participant; and
when the second participant answers the second call, forwarding, by the processor executable autodial administration agent to the at least one of the switch and the server, a signal associated with activation of a transfer or conference key, whereby the user, first participant, and second participant are connected simultaneously in a conference call, wherein the user maintains the communication device in the off hook state.

15. The method of claim 14, wherein, after the programmable activator has been activated, no further activators need be activated by the user to set up the conference call.

16. The method of claim 14, wherein the calls are made sequentially in a user selected order and wherein, in response to monitoring a user's manipulation of activators of a voice communication device, the processor executable autodial administration agent sends simultaneously the first and second telephone addresses to the at least one of the switch and the server.

17. The method of claim 16, wherein, when the first participant answers, a recorded message is played to the first participant and the first call to the first participant is placed on hold.

18. A non-transitory computer readable medium comprising processor executable instructions for performing the steps of claim 14.

19. A voice communication device, comprising:
a processor executable autodial administration agent operable to:
identify a sequence of two or more activators repetitively activated by a user by maintaining a set of data structures comprising a set of activator identifiers associated with the two or more activators, a timestamp associated with an instance of user activation of the two or more activators or receipt of a call from a telephone number corresponding to the two or more activators, and a counter indicating a number of instances, within a selected time period, that a user has activated the two or more activators or received a call from the telephone number, wherein the set of data structures further comprises an answer type of a call to a telephone number associated with the sequence of two or more of activators and wherein the answer type describes one of: a live person answered the call, an answering machine answered the call, the call was not answered, and a called telephone number was busy when the call was placed, wherein user activation of a sequence of two or more activators causes at least one of a selected telecommunication function and a selected telecommunication feature to be performed, wherein the at least one of the selected telecommunication function and the selected telecommunication feature is one of navigating a common menu, playing an account code, starting a teleconference, creating a bookmark for a frequently used website address, sending a facsimile transmission, selecting a previously dedicated key, and administering out-of-office messages;
in response to identifying a sequence of two or more activators, prompt the user whether to associate the two or more activators in the sequence with a common activator, whereby activation of the common activator automatically causes the at least one of the selected telecommunication function and the selected telecommunication feature to be performed;
when the user affirmatively responds, associate the two or more activators in the sequence with the common activator; and
when the user negatively responds, not associate the two or more activators in the sequence with the common activator and marking the two or more activators as being ineligible for further prompting of the user with the at least one of the selected telecommunication function and the selected telecommunication feature.

20. The device of claim 19, wherein the at least one of the selected telecommunication function and the selected telecommunication feature is placement of a call to a selected telephone address, wherein the common activator is a programmable key, wherein user activation of the common activator causes a telephone number to be dialed, and wherein further instances of activation of the two or more activators are thereafter ignored.

21. The device of claim 19, wherein when the user presses the common activator once, the method further comprising the operation: simulate the activation of the two or more activators required to perform at least one of the selected telecommunication function and the selected telecommunication feature.

22. The device of claim 19, wherein the at least one of the selected telecommunication function and the selected telecommunication feature is initiation of a telephone call, wherein the common activator is a programmable key, wherein operations to prompt the user, associate the two or more activators in the sequence with the common activator, and not associate the two or more activators in the sequence occur after the user has activated the programmable key and prior to placement of the telephone call, and wherein the set of data structures further includes a duration of the telephone call associated with the two or more activators.

23. The device of claim 19, wherein the at least one of the selected telecommunication function and the selected telecommunication feature is a telephone call and wherein identifying a sequence of two or more activators repetitively activated by a use comprises the sub-operations:
 compare a number of instances of calls to or from a telephone address corresponding to the two or more activators in the sequence with a selected threshold frequency;
 when the number of instances exceed the selected threshold frequency, perform operation to prompt the user whether to associate the two or more activators in the sequence with a common activator; and
 when the number of instances does not exceed the selected threshold frequency, not perform operation to associate the two or more activators in the sequence with the common activator.

24. The device of claim 19, wherein the set of data structures further comprises a duration of a call to or from a telephone address associated with the two or more activators.

25. The device of claim 19, wherein two or more activators correspond to a telephone number and wherein the set of data structures further comprises a descriptor associated with the two or more activator identifiers, the descriptor describing a characteristic of at least one of a communication device and person associated with the telephone number.

26. The device of claim 19, wherein the set of data structures further comprises an answer type of a call to a telephone number associated with the two or more activators in the sequence and wherein the answer type describes one of: a live person answered the call, an answering machine answered the call, the call was not answered, and the called telephone number was busy when the call was placed.

27. The device of claim 19, wherein the set of data structures further comprise a call type, the call type indicating whether a telephone call to or from a telephone number associated with the two or more activators is incoming to the voice communication device or outgoing from the voice communication device.

* * * * *